United States Patent [19]
Saiko et al.

[11] Patent Number: 6,026,942
[45] Date of Patent: Feb. 22, 2000

[54] BIDIRECTIONAL DIFFERENTIAL CLUTCH

[75] Inventors: Masaaki Saiko, Nagoya; Hiromi Nojiri, Iwata, both of Japan

[73] Assignee: Aichi Kikai Kogyo Kabushiki Kaisha, Nagoya, Japan

[21] Appl. No.: 09/241,612

[22] Filed: Feb. 2, 1999

[30]      Foreign Application Priority Data

Mar. 3, 1998   [JP]   Japan ................................. 10-069541

[51] Int. Cl.⁷ ............................. F16D 41/10; F16D 43/02
[52] U.S. Cl. ............................... 192/37; 192/43; 192/45.1
[58] Field of Search ................................ 192/37, 43, 35, 192/45.1; 180/249

[56]           References Cited

U.S. PATENT DOCUMENTS 5,025,902   6/1991   Imai et al. ................................. 192/43
5,429,219   7/1995   Itoh et al. ........................... 192/45.1 X
5,477,951   12/1995  Itoh et al. ............................... 192/45.1
5,848,679   12/1998  Saiko et al. ............................... 192/37

FOREIGN PATENT DOCUMENTS

H 925959   1/1997   Japan .

*Primary Examiner*—Rodney H. Bonck
*Attorney, Agent, or Firm*—Dennison, Meserole, Scheiner & Schultz

[57]           ABSTRACT

In a bidirectional differential clutch in which a rotation of the input gear is transmitted to the rotational shaft through the sprags only when the input gear rotates faster than the rotational shaft, a play in a rotational direction is provided between the rotational shaft and an output gear. With this structure, even when the rotational direction of the input gear is switched from the normal direction to the reverse direction, the sprags can excellently incline so that the bidirectional differential clutch can be rotated in the reverse direction.

2 Claims, 10 Drawing Sheets

BIDIRECTIONAL DIFFERENTIAL CLUTCH

BACKGROUND OF THE INVENTION

1. Field of the Invention

The present invention relates to an improvement of a bidirectional differential clutch.

2. Description of the Prior Art

Japanese Patent Application Laid-open No. H9-25959 discloses a conventional bidirectional differential clutch which as a structure shown in a vertical sectional view of FIG. 8, and in a semi-sectional view of FIG. 9 taken along the line IX—IX in FIG. 8. A rotational shaft 1 is rotatably supported by bearings 13 and 14, and an input gear 2 is rotatable supported around an outer periphery of the rotational shaft 1 by a bearing 15 at a distance from the bearing 14. A plurality of sprags 8 are interposed between an outer peripheral surface of the rotational shaft 1 and an inner peripheral surface of the input gear 2. Each of the sprags 8 is interposed between a pocket portion of an outer holding member 6, which is fixed to the inner peripheral surface of the input gear 2, and a pocket portion of an inner holding member rotatably disposed around the outer periphery of the rotational shaft 1 through a bearing 16. A pin 10 is provided in the inner holding member 4 and is inserted into a notch 7 formed in the outer holding member 6. The inner holding member 4 is mounted inside the input gear 2 through a bearing 17. A friction plate 3 is rotatably mounted on an end of the inner holding member 4 and is pressed against a flange 4a of the inner holding member 4 by resiliency of a resilient member 5. The friction plate 3 is prevented from rotating by a peripheral case. As shown in FIG. 10, the inner holding member 4, which abuts the frictional plate 3 under pressure, generates a difference in speed with respect to the rotation of the input gear 2, and the inner holding member 4 relatively rotates leftward in the drawing until a stopper 10 abuts against an end of the outer holding member 6. With this relative rotation, each of the sprags 8 inclines. In this case, if the rotational shaft 1 rotates faster than the input gear 2, the sprag 8 rises and the rotational shaft 1 rotates idly. However, if the rotational shaft 1 rotates slower than the input gear 2, the sprag inclines so that the inner peripheral surface of the input gear 2 is connected to the outer peripheral surface of the rotational shaft 1, and the rotation of the input gear 2 is transmitted to the rotational shaft 1. That is, this bidirectional differential clutch transmits the rotational force of the input gear 2 to the rotational shaft 1 only when the input gear 2 rotates faster than the rotational shaft 1 regardless of the rotational direction.

An output gear 9 is spline-fitted around the outer periphery of the rotational shaft 1, and a gear at the side of vehicle wheels, for example, engages with the output gear 9 to transmits the rotational force to the vehicle wheels.

When the bidirectional differential clutch having such a structure is incorporated in a continuously variable transmission of an automobile, for example, in a state where a tension force of a belt of the continuously variable transmission can not be released at the time of switching of the running direction of the automobile between a forward direction and a rearward direction, when the bidirectional differential clutch is to be rotated in the reverse direction after the bidirectional differential clutch rotated in the normal direction and stopped, the sprags 8 can not incline in the reverse direction if a rotational speed ratio of the input gear 2 to the rotational shaft 1 is one or less. Therefore, a problem is caused that it is impossible to rotate in the reverse direction.

SUMMARY OF THE INVENTION

The present invention has been accomplished in view of the above described conventional problem, and it is an object of the invention to provide a bidirectional differential clutch capable of inclining sprags excellently at the time of reverse rotation so that it is possible to rotate in the reverse direction. Thus, a bidirectional differential clutch is provided in which a plurality of sprags are interposed between an outer peripheral surface of a rotational shaft and an inner peripheral surface of an input gear rotatably disposed around an outer periphery of the rotational shaft, rotation of the input gear is transmitted to the rotational shaft through the sprags only when the input gear rotates faster than the rotational shaft, a play in a rotational direction is provided between the rotational shaft and an output gear to which rotation of the rotational shaft is transmitted.

With this structure, when the input gear is stopped after normal rotation and is then rotated in the reverse direction, the sprags excellently incline in the reverse direction because of the provision of the play, so that it is possible to rotate in the reverse direction.

A friction force in a rotational direction may be applied to the rotational shaft such that a rotational direction of the rotational shaft and a rotational direction of the play are always opposite to each other.

With this structure, when the input gear is stopped after normal rotation and is then rotated in the reverse direction, the sprags excellently incline in the reverse direction during that time since the rotational shaft is not rotated. Therefore, it is possible to excellently rotate the bidirectional differential clutch in the reverse direction.

The above and other objects, features and advantages of the invention will become apparent from the following description of the preferred embodiments taken in conjunction with the accompanying drawings.

DETAILED DESCRIPTION OF THE INVENTION

Embodiments of the present invention will be explained based on the drawings below.

Figure 1:
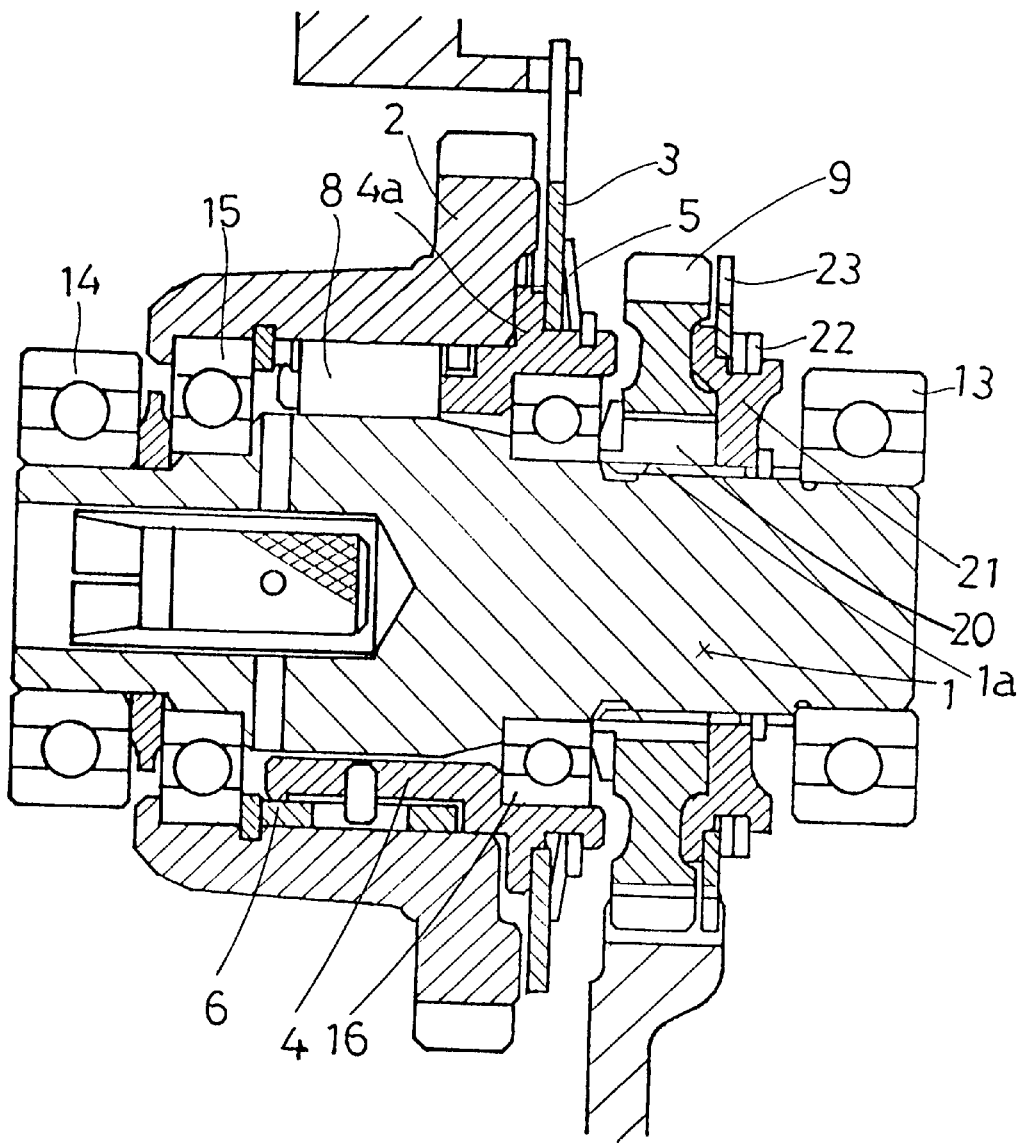
FIG. 1 is a vertical sectional view of the entire bidirectional differential clutch of a first embodiment.
Figure 2:
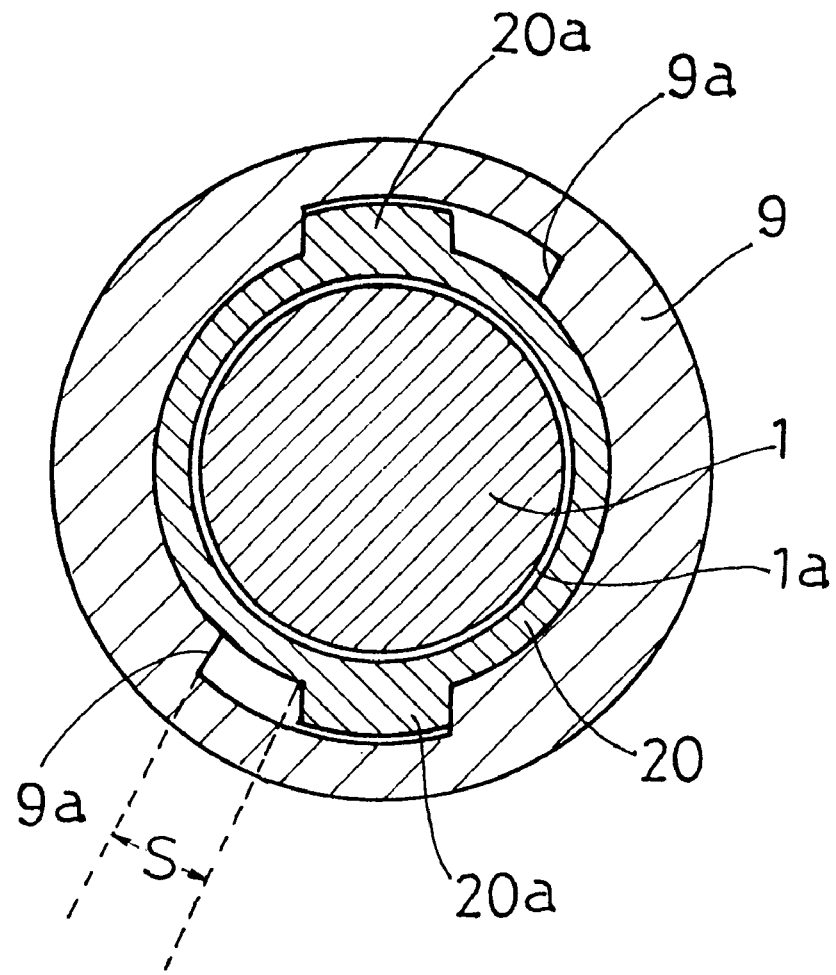
FIG. 2 is a sectional view of an output gear portion in FIG. 1.

FIG. 1 is a vertical sectional view of the entire bidirectional differential clutch of a first embodiment, and FIG. 2 is a sectional view of an output gear portion in FIG. 1.

Figure 8:
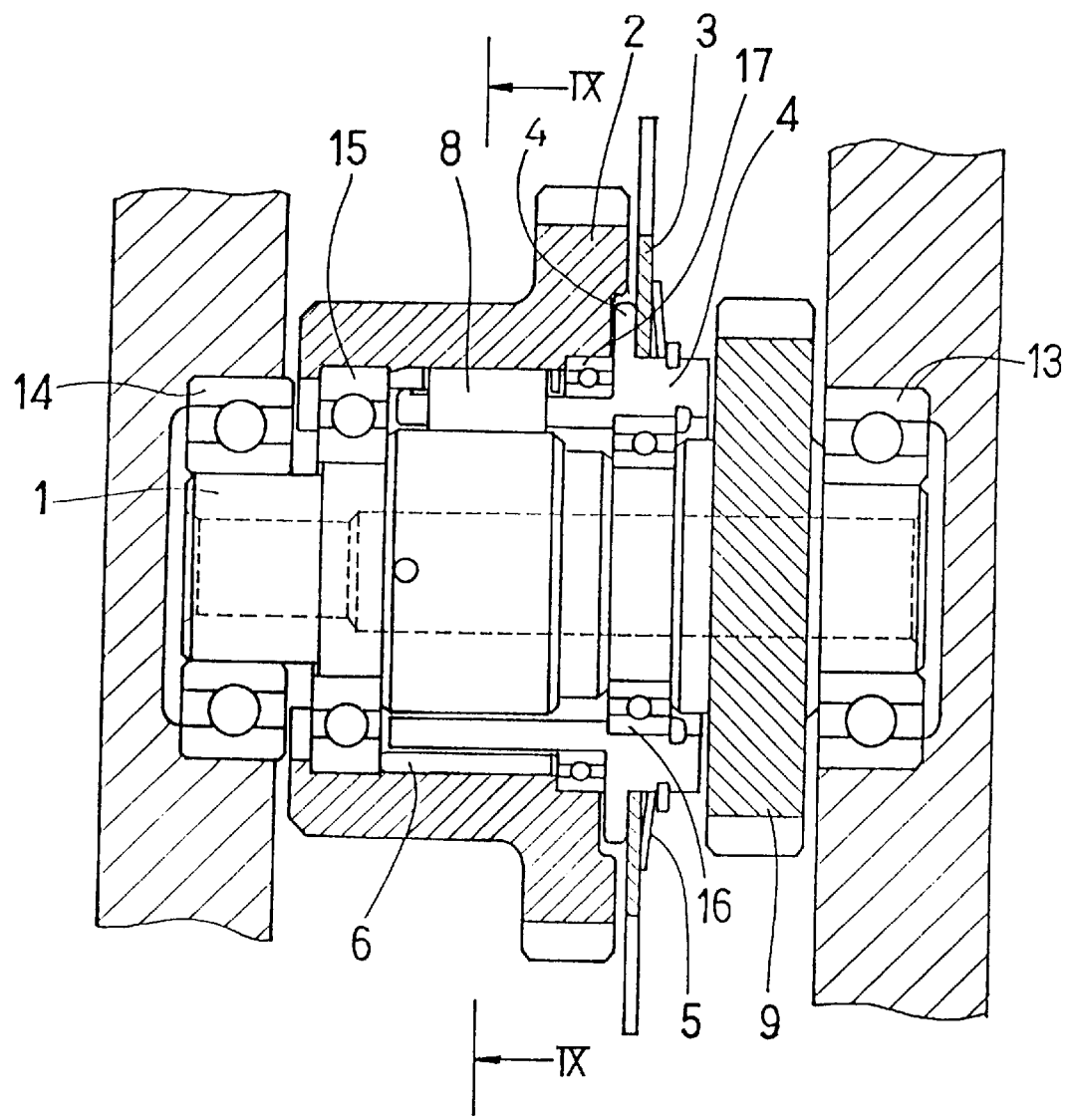
FIG. 8 is a vertical sectional view of the entire conventional bidirectional differential clutch.
Figure 9:
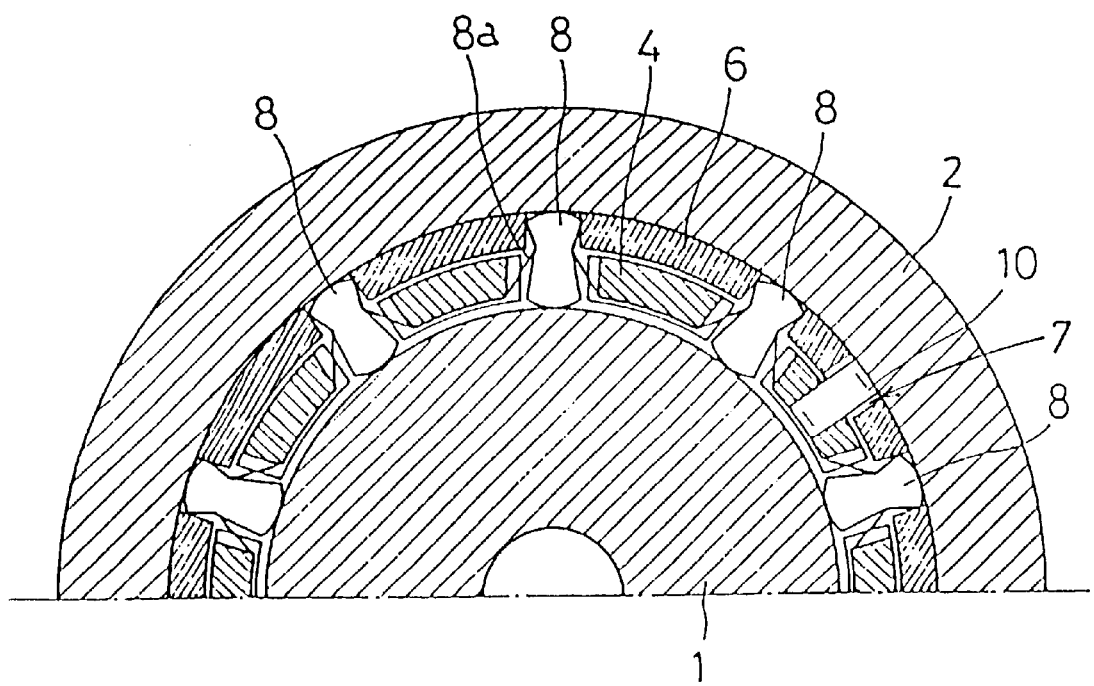
FIG. 9 is a sectional view taken along the line IX—IX in FIG. 8.
Figure 10:
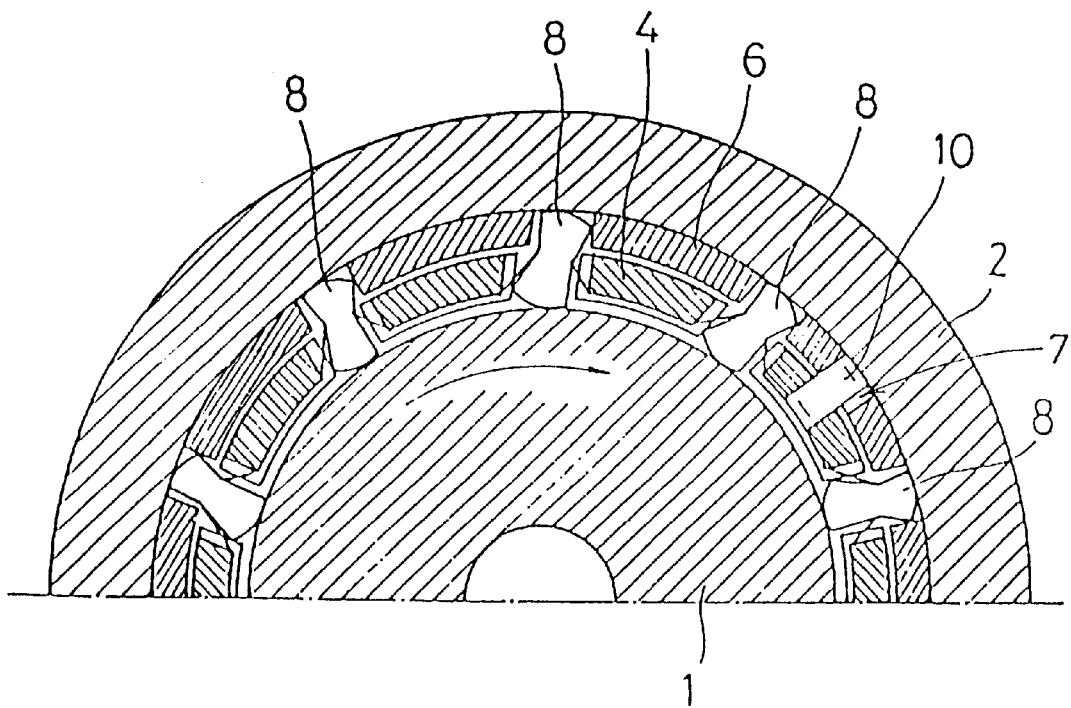
FIG. 10 is an explanatory diagram showing the operation of the conventional bidirectional differential clutch.

In the drawings, elements similar to those shown in FIGS. 8 to 10 are designated by the same reference numerals, and their detailed explanations will be omitted. In the first embodiment, a spline 1a is formed on an outer periphery of a rotational shaft 1, and a sleeve 20 is fitted around the outer periphery of the rotational shaft 1 through the spline 1a. A pair of outward projecting engaging projections 20a are integrally formed on the sleeve 20 at positions opposed to each other. A pair of engaging recesses 9a extend in the rotational direction and are formed in an inner periphery of an output gear 9 which is mounted on an outer periphery of the sleeve 20. The engaging projections 20a engage in the recesses 9a. A play S in the rotational direction is formed in each of the engaging recesses 9a between the engaging recess 9a and the engaging projection 20a.

A bracket 21 is fitted around the spline 1a of the rotational shaft 1 and is provided on a side of the output gear 9. A sub-gear 23 is provided around an outer periphery of the bracket 21 such that the sub-gear 23 is biased by a spring 22. That is, the sub-gear 23 engages with both the output gear 9 and a gear at the side of vehicle wheels. Since the sub-gear 23 is pushed by the spring 22, a friction force is generated against the rotational shaft in the rotational direction when the bracket 21 is rotated by rotation of the rotational shaft 1.

Figure 3:
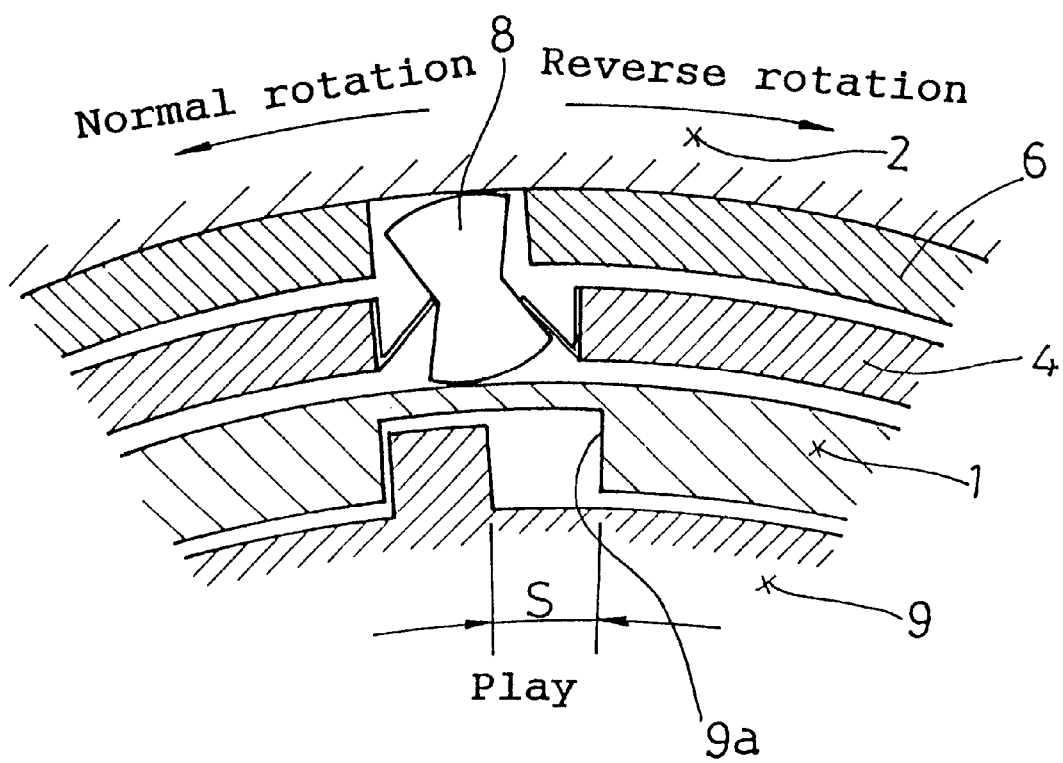
FIG. 3 is a schematic explanatory diagram showing the operation.
Figure 4:
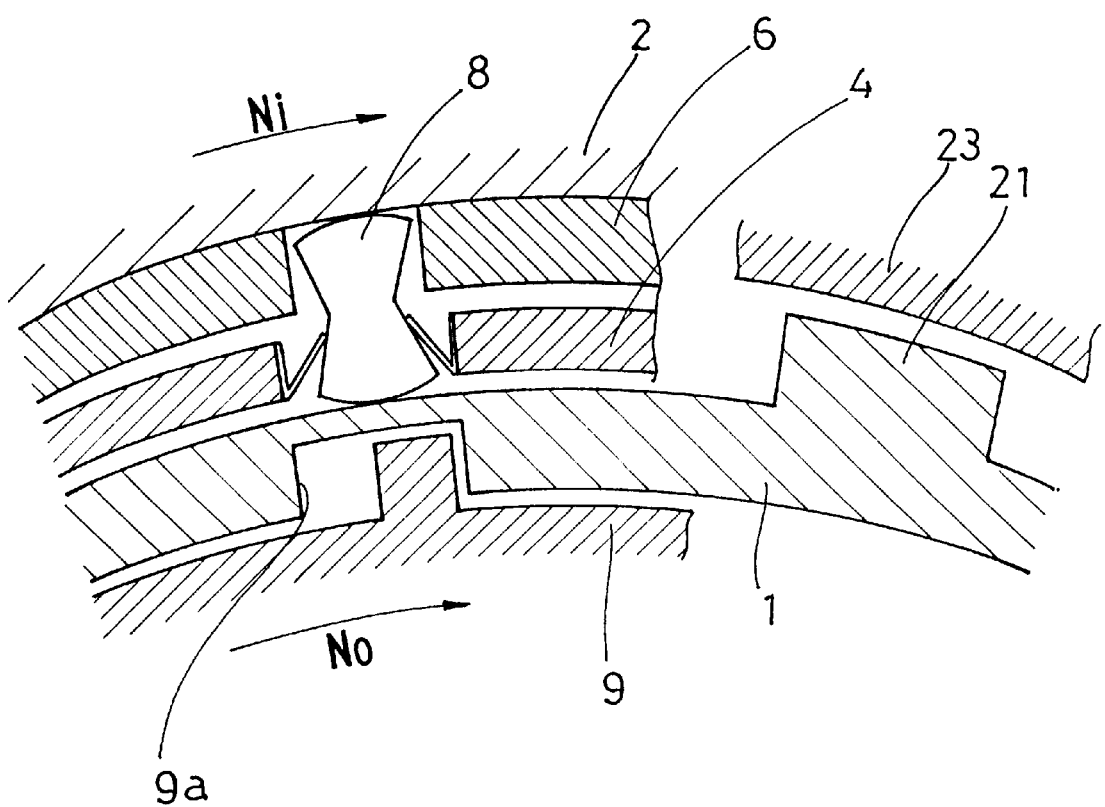
FIG. 4 is a schematic explanatory diagram showing the operational state at the time of reverse rotation.

The operation will be explained with reference to a schematic explanatory diagram in FIG. 3. When the input gear 2 rotates in the normal direction (counterclockwise direction), the sprags 8 incline if the input gear 2 rotates faster than the rotational shaft 1. Therefore, the rotational force of the input gear 2 is transmitted to the rotational shaft 1. If the running direction of the automobile is switched from this state, the input gear 2 is stopped and then rotated in the reverse direction. At that time, assuming that the rotational speed No of the rotational shaft 1 is defined as a denominator and the rotation speed Ni of the input gear 2 is defined as numerator, the sprags 8 do not incline even if the input gear 2 is reversely rotated when a speed ratio is one or less, or when the rotational speed of the rotational shaft 1 is equal to or faster than that of the input gear 2. Thus, the reverse rotational force of the input gear 2 can not be transmitted to the rotational shaft 1. However, in the present embodiment, the play S is formed in each of the engaging recesses 9a between the output gear 9 and the rotational shaft 1, the friction force is applied to the rotational shaft 1 through the sub-gear 23. Therefore, the rotation of the rotational shaft 1 is stopped, and the sprags 8 excellently incline in the reverse direction before the engaging projection 20a abuts against the opposite side wall surface of the engaging recess 9a. As a result, the rotation in the reverse direction of the input gear 2 can excellently be transmitted to the rotational shaft 1.

Because the friction force is applied to the rotational shaft 1 in the rotational direction by the operation of the sub-gear 23, the rotational direction of the rotational shaft 1 is always opposite to the direction of the play S. Therefore, the sprags 8 can excellently be inclined in the reverse direction to rotate in the reverse direction.

Figure 5:
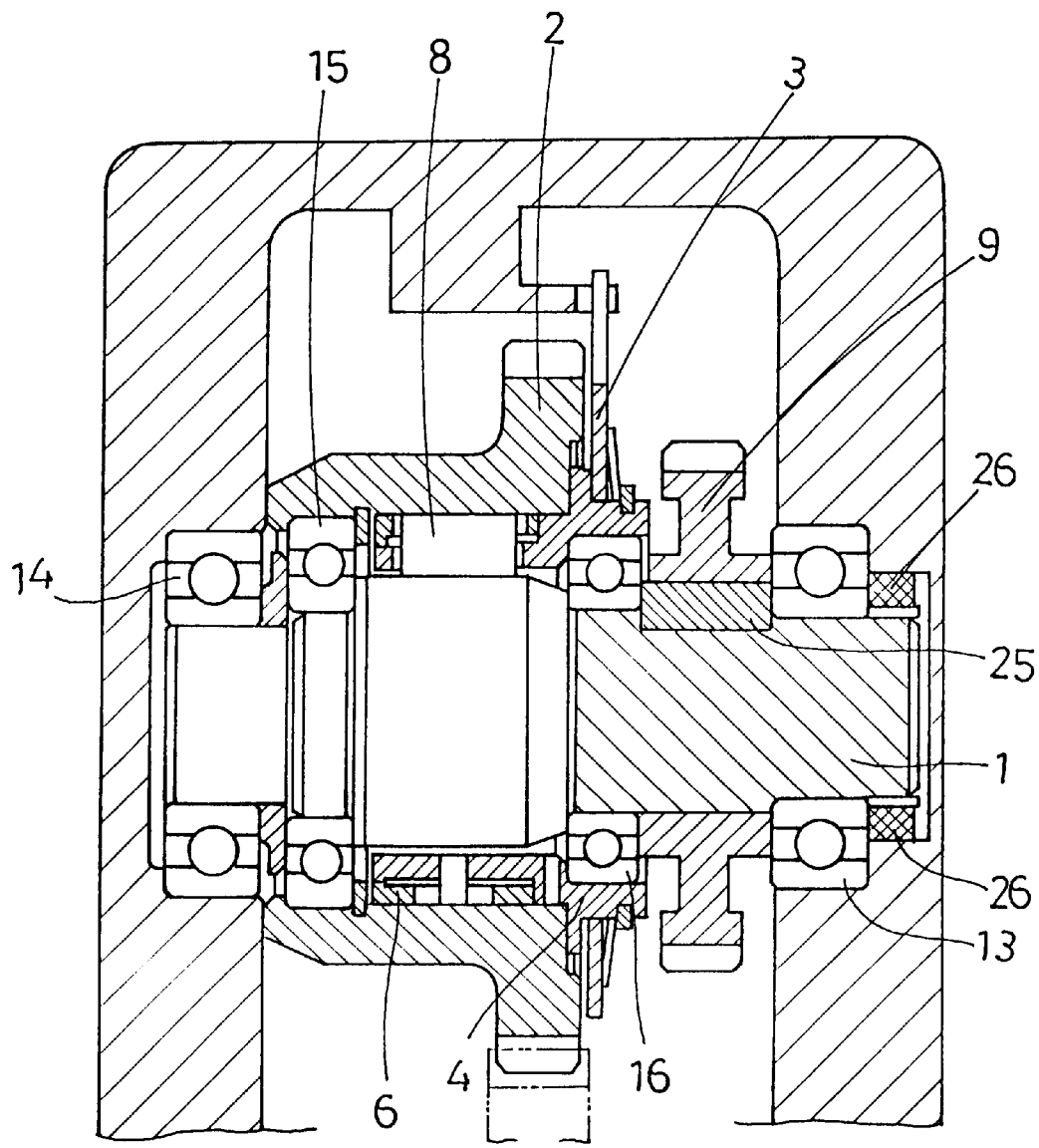
FIG. 5 is a vertical sectional view of the entire bidirectional differential clutch of a second embodiment.
Figure 6:
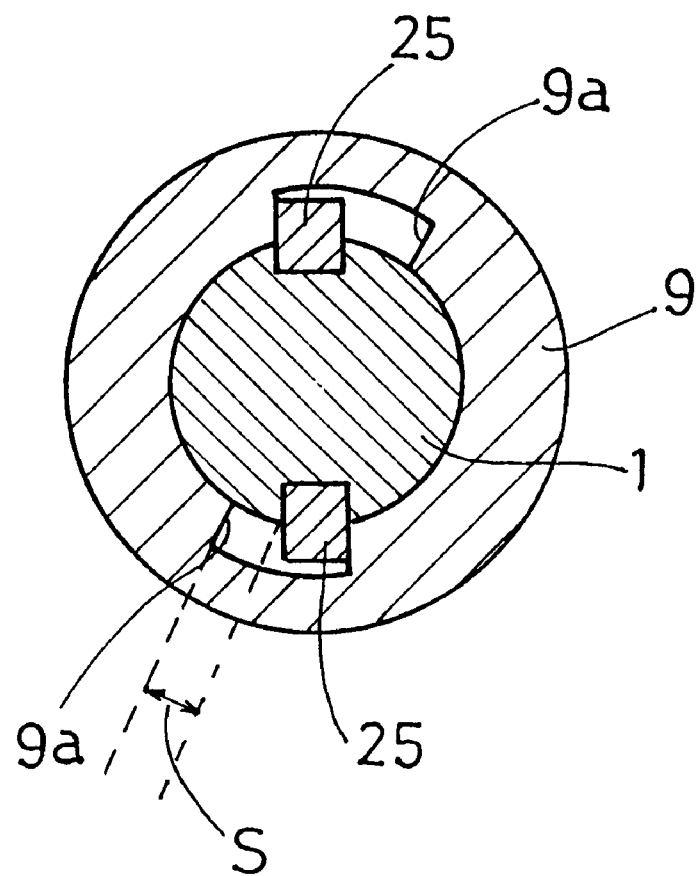
FIG. 6 is a sectional view of an output gear portion in FIG. 5.
Figure 7:
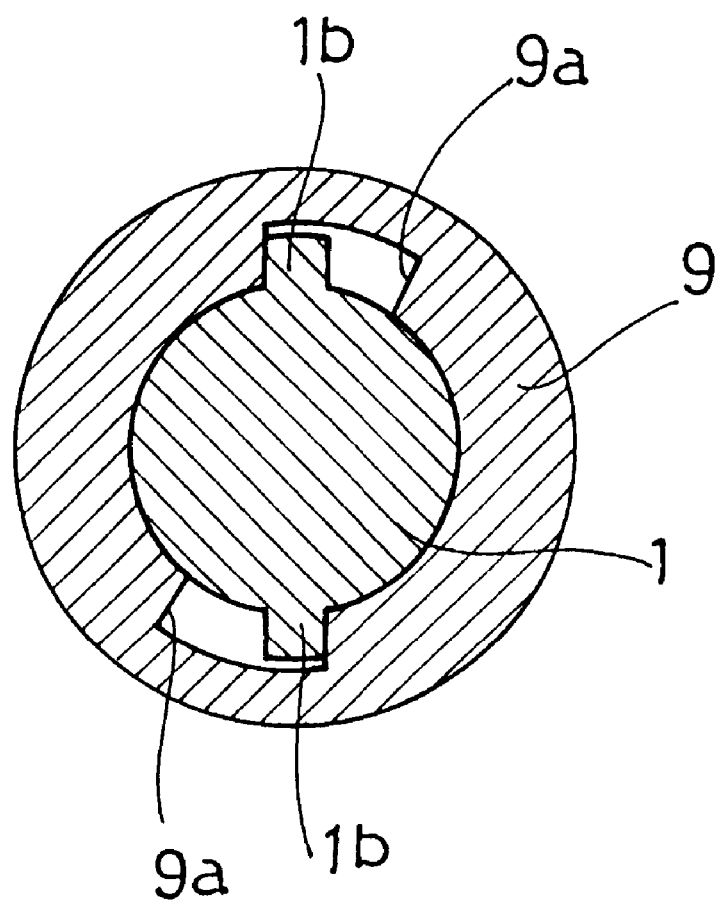
FIG. 7 is a sectional structural view in which an engaging projection is formed instead of keys in FIG. 6.

Next, FIG. 5 shows a second embodiment. In the second embodiment of FIG. 5, as shown in a sectional view of the output gear 9 of FIG. 6, a pair of keys 25 are fixed around the outer periphery of the rotational shaft 1 and are opposed to each other. The keys 25 are disposed in the engaging recesses 9a which are formed in the inner periphery of the output gear 9 and which are opposed to each other. In order to apply the friction force to the rotational shaft 1, a friction material 26 is disposed around the outer periphery of the rotational shaft 1.

Instead of the keys 25 and 25, a pair of engaging projections 1b may be integrally formed around the outer periphery of the rotational shaft 1. These engaging projections 1b may be disposed in the engaging recesses 9a and of the output gear 9.

In the present embodiment also, the play S is formed in the rotational direction in each of the engaging recesses 9 between the rotational shaft 1 and the output gear 9. Due to this play S, when the input gear is stopped after normal rotation and is then rotated reversely, the sprags can incline in the reverse direction during that time since the rotational shaft is not rotated. Therefore, it is possible to rotate the rotational shaft 1 in the reverse direction. Thus, the friction material 26 applies the friction force to the rotational shaft 1 in the rotational direction so that the rotational shaft rotates in the opposite direction to the rotational direction of the play S. As a result, the bidirectional differential clutch can excellently be rotated reversely.

What is claimed is:

1. A bidirectional differential clutch in which a plurality of sprags are interposed between an outer peripheral surface of a rotational shaft and an inner peripheral surface of an input gear which are rotatably disposed around an outer periphery of said rotational shaft, and in which rotation of said input gear is transmitted to said rotational shaft through said sprags only when said input gear rotates faster than said rotational shaft, wherein a play in a rotational direction is provided between said rotational shaft and an output gear to which a rotation of said rotational shaft is to be transmitted, and wherein a friction force in a rotational direction is applied to said rotational shaft such that a rotational direction of said rotational shaft and a rotational direction of said play are always opposite to each other.

2. A bidirectional differential clutch according to claim 1 further including a subgear disposed on one side of said output gear and a bracket fitted about said rotational shaft, said subgear being pressed against said bracket by a resilient member and having teeth that are smaller in number than teeth of said output gear, both said subgear and said output gear engaging a gear on the side of vehicle wheels, so that a frictional force is applied to said rotational shaft by said subgear when said rotational shaft rotates.

* * * * *

UNITED STATES PATENT AND TRADEMARK OFFICE
CERTIFICATE OF CORRECTION

PATENT NO. : 6,026,942
DATED : February 22, 2000
INVENTOR(S) : Masaaki Saiko, et. al.

It is certified that error appears in the above-identified patent and that said Letters Patent is hereby corrected as shown below:

Title page:
The Assignees should appear as follows:
[73] Assignee: Aichi Kikai Kogyo Kabushiki Kaisha, Nagoya, Japan, NTN Corporation, Osaka, Japan Signed and Sealed this Eleventh Day of September, 2001

Attest:

*Attesting Officer*

NICHOLAS P. GODICI
*Acting Director of the United States Patent and Trademark Office*